United States Patent
Closse et al.

(10) Patent No.: US 8,027,783 B2
(45) Date of Patent: Sep. 27, 2011

(54) DEVICE FOR GUIDING AN AIRCRAFT ALONG A FLIGHT TRAJECTORY

(75) Inventors: Julien Closse, Blagnac (FR); Jean-Louis De Menorval, Aussonne (FR); Didier Averseng, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 998 days.

(21) Appl. No.: 11/934,502

(22) Filed: Nov. 2, 2007

(65) Prior Publication Data

US 2010/0332111 A1    Dec. 30, 2010

(30) Foreign Application Priority Data

Nov. 7, 2006    (FR) ..................... 06 09703

(51) Int. Cl.
*G06F 19/00*    (2006.01)
(52) U.S. Cl. ............... 701/120; 701/3; 340/976; 342/33
(58) Field of Classification Search .................. 701/120, 701/3; 244/76 C, 221; 342/33; 340/976; G06F 19/00
See application file for complete search history.

(56) References Cited

U.S. PATENT DOCUMENTS

| | | | | |
|---|---|---|---|---|
| 4,811,230 A | * | 3/1989 | Graham et al. ................. 701/16 |
| 5,512,903 A | * | 4/1996 | Schmidtke ............... 342/357.31 |
| 5,739,770 A | * | 4/1998 | Liden ............................ 340/976 |
| 6,178,379 B1 | * | 1/2001 | Dwyer ......................... 701/205 |
| 6,246,929 B1 | * | 6/2001 | Kaloust .......................... 701/11 |
| 6,516,272 B2 | * | 2/2003 | Lin ................ 701/214 |
| 6,571,171 B1 | * | 5/2003 | Pauly ........................... 701/206 |
| 6,643,580 B1 | * | 11/2003 | Naimer et al. ................ 701/206 |
| 7,551,989 B2 | * | 6/2009 | Knotts et al. ...................... 701/3 |
| 7,899,613 B2 | * | 3/2011 | Artini .......................... 701/120 |
| 7,908,046 B2 | * | 3/2011 | Huynh et al. ................... 701/14 |
| 7,949,438 B2 | * | 5/2011 | Artini et al. ....................... 701/3 |
| 2002/0022909 A1 | * | 2/2002 | Karem ............................ 701/3 |
| 2004/0078136 A1 | * | 4/2004 | Cornell et al. ............... 701/120 |
| 2005/0182530 A1 | * | 8/2005 | Murphy ......................... 701/16 |
| 2006/0109167 A1 | * | 5/2006 | Rouquette et al. ............. 342/33 |

FOREIGN PATENT DOCUMENTS

FR    2597226 A1 * 10/1987

* cited by examiner

*Primary Examiner* — Tuan C To
(74) *Attorney, Agent, or Firm* — Dickinson Wright PLLC

(57) ABSTRACT

An aircraft guidance device includes a flight computer that formulates all guidance orders for the aircraft, irrespective of a selected guidance mode.

9 Claims, 2 Drawing Sheets

DEVICE FOR GUIDING AN AIRCRAFT ALONG A FLIGHT TRAJECTORY

FIELD OF THE INVENTION

The present invention relates to a device for guiding an aircraft, in particular a transport airplane, along a flight trajectory comprising a plurality of successive segments.

DESCRIPTION OF THE PRIOR ART

It is known that transport airplanes are required to carry out aerial operations on airport take-off and landing, sometimes in very degraded meteorological conditions, for example with very low clouds and poor visibility conditions.

To allow the implementation of these operations, on-board instruments are generally used to pick up external signals originating from ground beacons or satellites, which make it possible to position and guide the airplane along a particular trajectory.

The greater the precision and integrity of the on-board instrument/external signal pair, the more the airplane can operate with low minima, that is to say without visibility at low heights with respect to the airport. Reducing these minima makes it possible in particular during landings to limit the number of go-arounds on account of poor weather, and thus to obtain a decrease in sound emissions, a reduction in pollution and a decrease in costs for airlines.

The on-board instrument/external signal pairs which make it possible to obtain the lowest minima currently relate to precision approaches of ILS type (standing for "Instrument Landing System") which use instrument landing systems. The on-board systems make it possible in this case to guide the airplane along a rectilinear trajectory defined by a radio signal originating from a ground beacon, which brings the airplane as far as a landing point on the runway.

SUMMARY OF THE INVENTION

The object of the present invention is in particular to allow an airplane to be able to fly in zones close to airports with the same level of performance as for an approach of the aforesaid ILS type, but to do so without having to resort to ground installations. These installations are indeed expensive and difficult to maintain and, moreover, they are not present on all airports. Furthermore, the ILS-type approaches permit only a rectilinear approach along a trajectory which is predefined by construction of the beacon used.

The integrity of an automatic flight management assembly which is used to automatically guide an airplane, and the safety which stems therefrom, are ensured by the integrity and safety of its various subsystems, namely in particular:
  a flight management system which constructs the reference trajectory which the airplane will have to follow;
  a flight computer which guides the airplane along this reference trajectory;
  display means which inform the pilot about the conduct of the flight; and
  links between each of these subsystems.

The performance (precision, integrity, etc.) of a navigation system, here designating a locating function and a trajectory construction function, rests mainly on two elements, namely, firstly, the airplanes position calculation performance, and secondly, the integrity of the trajectory constructed on the basis of data from a navigation database. The integrity level required for the construction of the trajectory depends on the type of operation envisaged. This is maximal for standard approaches of RNAV type (standing for "aRea NAVigation") in the course of which the airplane is guided automatically along a lateral and vertical trajectory defined by the flight management system. In this type of approach, it is necessary, if one wishes to reach the in-service decision heights for ILS-type precision approaches, to provide a device which guarantees the integrity of the trajectory which is provided to the flight computer.

Indeed, the integrity and the very high precision of radio navigation systems, such as ILS, GLS systems (standing for "Gps Landing System") or MLS (standing for "Microwave Landing System"), using ground beacons installed in the environs of airports, are nowadays unequalled, and these systems allow operations with very low minima and a risk of undetected guidance error of less than $10^{-7}$ per procedure flown. They allow precision approaches on arrival for 91% of worldwide flights, and in the best cases, they enable the decision heights or minima to be pushed back to between 0 and 200 ft (around 65 meters). To arrive at such performance levels, these complex systems provide the airplane, in various forms of electromagnetic signals, with its position with respect to a pre-established reference trajectory enabling said decision height or a safety altitude to be reached in complete safety, with the guidance means of the airplane.

Additionally, for other types of procedure, the arrival, departure or go-around trajectory is constructed by the flight management system, like all the trajectories of the remainder of the flight, before take-off or in flight. The latter dispatches the trajectories to be followed by the airplane to the flight computer. However, these trajectories constructed by the flight management system do not allow deployment close to the ground, in particular because of their low integrity. A low-altitude trajectory error undetected by the pilot may lead the airplane to leave its flight domain and to strike the relief or obstacles situated on the ground.

The object of the present invention is to improve the guidance function of a guidance device, not only for the near-ground phases, but also for all the other flight phases.

Generally, a guidance device such as that considered in the present invention comprises in particular:
  a navigation database;
  at least one flight management system which comprises means for determining at least one flight trajectory (or reference trajectory) of the aircraft with the aid of data received from said navigation database;
  a flight computer which carries out processing operations intended for guiding the aircraft along said flight trajectory; and
  means of actuation of control members (air foils, etc.) of the aircraft.

In a standard guidance mode of the aforesaid type, the flight management system implements the various actions and processing operations required for guiding the airplane. In particular:
  it determines the trajectory segment which is active;
  it formulates position errors;
  it participates in the choices of guidance modes and sub-modes; and
  it formulates the guidance orders for the managed modes, as well as for the guidance targets in the other guidance modes.

Also, on account of the low integrity of this flight management system, which is of the order of $10^{-5}$, as well as of the difference that may exist between the flight trajectory dispatched by the flight management system to the flight computer and that dispatched to display systems, resulting from a specific processing of said flight management system, this standard architecture as specified of the guidance device exhibits limits in terms of integrity and does not make it possible to implement the guidance of an airplane close to the ground without having to resort to means, such as beacons for example, which are installed on the ground.

The present invention relates to a guidance device for guiding an aircraft along a flight trajectory comprising a plurality of successive segments, which guidance device makes it possible to remedy the aforesaid drawbacks and makes it possible in particular to guide the aircraft with high integrity without using means situated on the ground.

To this end, according to the invention, said guidance device of the type comprising:
  at least one navigation database;
  at least one flight management system which comprises means for determining at least one flight trajectory of the aircraft with the aid of data received from said navigation database;
  a flight computer which carries out processing operations intended for guiding the aircraft along said flight trajectory; and
  means of actuation of control members of the aircraft,
is noteworthy in that said flight computer comprises at least the following integrated means:
  means for receiving said flight trajectory from said flight management system;
  means for determining the segment of said flight trajectory which is active;
  means for formulating errors of position between the actual position of the aircraft and the position that it would have if it were on said active segment; and
  means which comprise all the guidance laws for the aircraft, corresponding respectively to the various guidance modes capable of being selected and applied to the aircraft, and which are formed in such a way as to formulate all the guidance orders for the aircraft, doing so regardless of the guidance mode which is selected, said guidance orders being transmitted to said means of actuation.

Thus, by virtue of the guidance device in accordance with the invention, the integrity of the guidance of the aircraft is much increased, by virtue of rationalization and simplification of the exchanges between the flight management system and the flight computer, with respect to an aforesaid standard architecture. Indeed, only the flight trajectory is transmitted from the flight management system. All the guidance laws and all the processing operations with a view to guidance are indeed implemented by said flight computer which exhibits, as is known, by definition, a very high integrity, generally of the order of $10^{-7}$.

The flight trajectory to be followed is communicated with high integrity by the flight management system to the flight computer. The latter is then alone responsible for the guidance of the aircraft. According to the invention, the boundary between the functions implemented by the flight management system and the functions implemented by the flight computer is such that the construction of the flight trajectory is implemented by the flight management system and the sequencing of the flight plan is implemented by the flight computer.

In a preferred embodiment, said guidance device comprises means making it possible to guide the aircraft along said flight trajectory while ensuring a good level of performance. These means are formed in such a way as to allow the aircraft to ensure a speed over the flight trajectory, which is compatible with its turning capabilities. To this end, said means determine a maximum speed for each segment of the flight trajectory, as a function of the turning radius associated with said segment.

Furthermore, in a particular embodiment:
  said guidance device comprises, moreover, at least one display system capable of displaying said flight trajectory and a monitoring system capable of carrying out processing operations relating to said flight trajectory; and
  said flight management system communicates the same flight trajectory in one and the same format to said flight computer, to said display system and to said monitoring system.

Thus, the information which is displayed by the display system and presented to the pilot of the aircraft is made secure. The integrity of the displays is thus improved, the information dispatched to the flight computer being strictly the same as that dispatched to the display system (and to the monitoring system). One thus avoids problems related to a specific processing by the flight management system, such as exists in a standard guidance device, to adapt the format of the data dispatched to the display system, and which may result in a difference between the trajectory displayed and that following which the aircraft is guided, which may of course be a source of poor interpretation and stress for the pilot.

Furthermore, advantageously, to guard against a fault with the flight management system, said flight management system communicates to said flight computer all the flight trajectories available to it, and which are of the low-altitude type, and said flight computer comprises means for recording these low-altitude flight trajectories.

Furthermore, in a particular embodiment, said flight management system determines a four-dimensional flight trajectory comprising a three-dimensional trajectory and indications of corresponding times of passage, and said flight computer comprises means for comparing this four-dimensional flight trajectory with the actual position of the aircraft and with the current time, and for deducing therefrom speed directives forming part of said guidance orders.

Additionally, advantageously, the guidance device in accordance with the invention comprises, moreover, means for sending at least said flight trajectory out of the aircraft, in particular destined for ground controllers and/or destined for surrounding aircraft.

Furthermore, in order to ensure a high level of integrity, the guidance device comprises two flight management systems and verification means for checking the data sent by these two flight management systems. These verification means check that the data output by the two flight management systems are consistent, and they trigger alarms and voting logic in the event of conflict.

Furthermore, in a particular embodiment, said guidance device furthermore comprises:
  means for formulating a four-dimensional flight trajectory making it possible to comply with a particular spacing with respect to at least one other aircraft; and/or
  means which are integrated into the flight computer and which are formed in such a way as to generate guidance orders making it possible to adapt the energy of the aircraft during a descent (during an approach to a landing runway), by taking account in particular of information relating to the air brakes of this aircraft.

DESCRIPTION OF THE DRAWINGS

The figures of the appended drawing will elucidate the manner in which the invention may be represented. In these figures, identical references denote similar elements.

DESCRIPTION OF THE PREFERRED EMBODIMENTS

Figure 1:
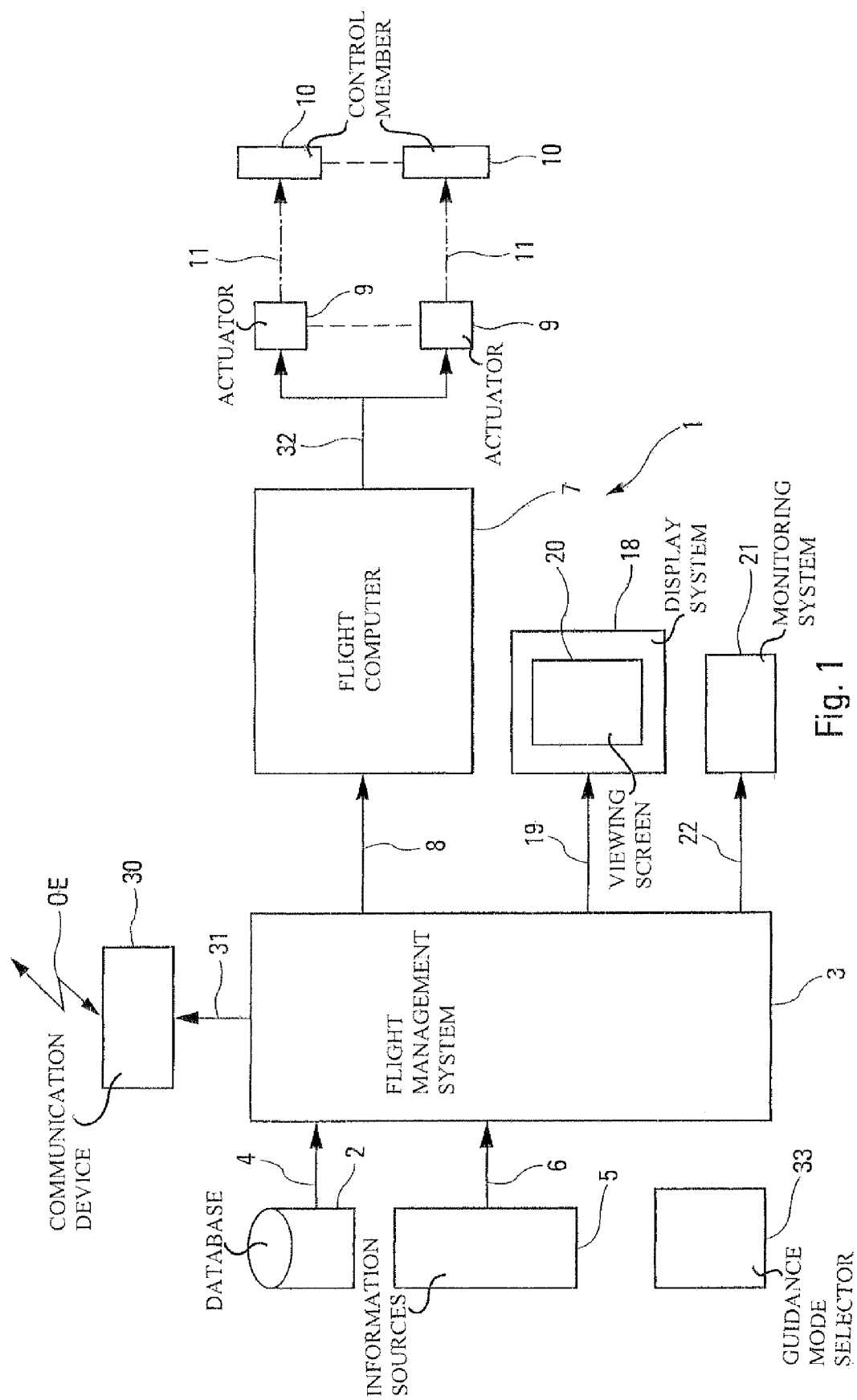
FIG. 1 is the schematic diagram of a guidance device in accordance with the invention.

The guidance device 1 in accordance with the invention and represented diagrammatically in FIG. 1 is intended to guide an aircraft (not represented), fox example a transport airplane (civil or military), along a flight trajectory comprising a plurality of successive segments.

Said device 1 which is carried on-board the aircraft, is of the type comprising
- at least one navigation database 2;
- at least one flight management system 3, for example of FMS ("Flight Management System") type, which is connected by way of a link 4 to said navigation database 2 and which comprises integrated means for determining in a standard manner at least one flight trajectory of the aircraft, with the aid in particular of data received from said navigation database 2, as well as data received from a set 5 of standard information sources, which is connected by way of a link 6 to said flight management system 3;
- a flight computer 7, for example of FG ("Flight Guidance") type, which is connected by way of a link 8 to said flight management system 3 and which carries out processing operations intended for guiding the aircraft along the flight trajectory; and
- standard means of actuation 9 of control members 10 of the aircraft, for example air foils (lateral air foils, elevators, roll air foils) of said aircraft. Said means of actuation 9 receive guidance orders and correspondingly actuate said control members 10, as illustrated by a chain-dotted link 11.

Figure 2:
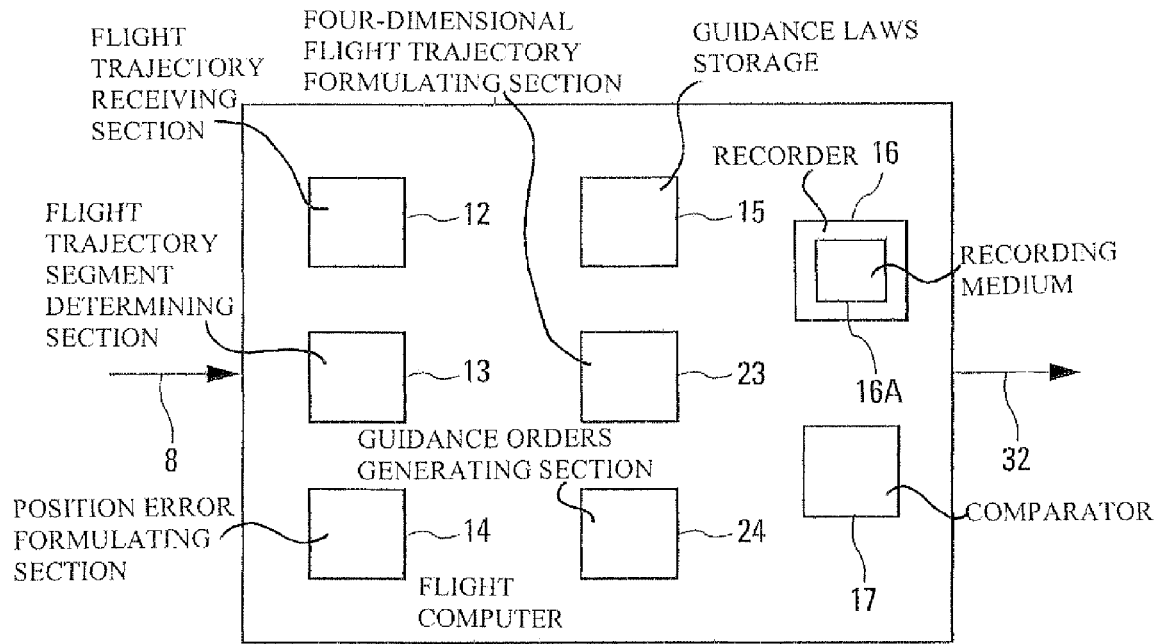
FIG. 2 diagrammatically illustrates a preferred embodiment of a flight computer in accordance with the invention.

According to the invention, said flight computer 7 comprises the following integrated means, which are represented in FIG. 2:
- means 12 for receiving said flight trajectory from said flight management system 3, by way of said link 8;
- means 13 for determining the segment received, which is active, of this flight trajectory, that is to say the segment with respect to which the aircraft is currently guided. To do this, said means 13 compare the current position of the aircraft with the flight plan and deduce therefrom the segment according to which the aircraft is guided;
- means 14 for formulating errors of position between the actual position of the aircraft (which is determined by a standard sensor forming part for example of said set 5 of information sources) and the position that it would have if it were on said active segment. The latter position is determined directly by said flight computer 7 by performing an orthogonal projection of the current position of the aircraft onto the flight trajectory; and
- means 15 which comprise all the guidance laws for the aircraft, corresponding respectively to the various guidance modes capable of being selected and applied to the aircraft, and which are formed in such a way as to formulate all the guidance orders for the aircraft, doing so regardless of the guidance mode which is selected. By way of illustration, the following possible guidance modes may be cited: managed on a flight plan or selected on directive from the pilot. The guidance orders generated by said means 15 are transmitted by way of a link 32 to said means of actuation 9 of said control members 10.

The device 1 comprises, moreover, standard selection means 33 which allow the pilot of the aircraft to manually select one of the various existing guiding modes, so that the aircraft is guided with the aid of the guidance mode thus selected.

Thus, by virtue of the guidance device 1 in accordance with the invention, the integrity of the guidance of the aircraft is much increased, on account of rationalization and simplification of the exchanges between the flight management system 3 and the flight computer 7, with respect to a standard architecture. Indeed, the flight trajectory alone is transmitted from the flight management system 3 to the flight computer 7. All the guidance laws and all the processing operations necessary for guidance are indeed implemented by said flight computer 7 which exhibits, as is known, by definition, a very high integrity, generally of the order of $10^{-7}$.

The flight trajectory to be followed is communicated with high integrity by the flight management system 3 to the flight computer 7. The latter is then alone responsible for the guidance of the aircraft. According to the invention, the boundary between the functions implemented by the flight management system 3 and the functions implemented by the flight computer 7 is such that the construction of the flight trajectory is implemented by the flight management system 3 and the sequencing of the flight plan is implemented by the flight computer 7.

In a preferred embodiment, said guidance device 1 comprises integrated means making it possible to guide the aircraft along said flight trajectory while ensuring a good level of performance. These means are formed in such a way as to allow the aircraft to ensure a speed over the flight trajectory, which is compatible with its turning capabilities. To this end, said means determine a maximum speed for each segment of the flight trajectory, as a function of the turning radius associated with said segment.

Furthermore, in a particular embodiment:
- the guidance device 1 comprises, moreover:
  - a standard control and display system 18, for example of CDS ("Control and Display System") type, which is connected by way of a link 19 to said flight management system 3 and which is capable of displaying on at least one viewing screen 20 information received from said flight management system 3, and in particular the flight trajectory formulated by this flight management system 3; and
  - a standard monitoring system 21, for example of the AESS ("Aircraft Environment Surveillance System") type, which is intended to monitor the environment of the aircraft, by carrying out processing operations on the basis of the flight trajectory received from said flight management system 3 by way of a link 22; and
- said flight management system 3 communicates the same flight trajectory, in one and the same format, to said flight computer 7, to said display system 18 and to said monitoring system 21.

Thus, the information which is displayed by the display system 18 and presented to the pilot of the aircraft is made secure. The integrity of the displays is thus improved, the information dispatched to the flight computer 7 being strictly the same as that dispatched to the display system 18 (and to the monitoring system 21). One thus avoids problems related to a specific processing by the flight management system, such as exists in a standard guidance device, to adapt the format of the data dispatched to the display system, and which may result in a difference between the trajectory displayed and that following which the aircraft is guided, which may possibly be a source of poor interpretation and stress for the pilot.

Said flight management system 3 generates a flight trajectory in standard fashion with the aid of input data such as route points, departure and arrival procedures, criteria on the successive segments of the flight trajectory, and altitude and/or speed constraints.

Furthermore, to guard against a fault, the flight management system 3 communicates to said flight computer 7 all the flight trajectories available to it, which are of the low-altitude type, and said flight computer 7 comprises means 16 for recording, on a standard recording medium 16A, these low-altitude flight trajectories.

For the other phases of the flight, the flight management system 3 can limit itself to dispatching three or four segments which follow the segment which is active. The flight trajectory is constructed with the aid of input data which are of geometric type (geographical coordinates of route points and of links between two successive route points) and contain constraints associated with the passage of each route point (maximum or minimum altitude when overflying this route point, maximum or minimum speed to be complied with). It is split according to two plans, the lateral plan (for horizontal navigation) and the longitudinal plan (for vertical navigation, including the speed constraints to be complied with). To improve guidance, the longitudinal flight plan takes into account constraints regarding the time of passage at each route point. A speed profile is then calculated in real time to satisfy these constraints which form a four-dimensional trajectory. To do this, said flight management system 3 determines a four-dimensional flight trajectory comprising a three-dimensional trajectory and indications of corresponding times of passage, and said flight computer 7 comprises means 17 for comparing this four-dimensional flight trajectory with the actual position of the aircraft and with the current time and for deducing therefrom speed directives forming part of said guidance orders (which are transmitted to the means of actuation 9).

Furthermore, in a particular embodiment, the flight computer 7 comprises, moreover, means 23 for formulating a four-dimensional flight trajectory, making it possible to comply with a particular spacing with respect to at least one other aircraft. To do this, the flight computer 7 receives from the flight management system 3 the three-dimensional position and the speed of the airplane to be followed, as well as the directive and the type of spacing, and said means 23 formulate the four-dimensional trajectory to which the aircraft must adhere. This function makes it possible to manage a spacing of the aircraft in the environs of points of entry to a controlled air zone, thereby making it possible in particular to ease air control and improve the flow of air traffic. In a variant embodiment, the processing operations implemented by means 23 may also be implemented by the means (not represented) which are integrated into the flight management system 3.

Additionally, in a particular embodiment, the flight computer 7 comprises, moreover, means 24 which are integrated and which are formed in such a way as to generate guidance orders making it possible to adapt the energy of the aircraft during a descent (during an approach with a view to landing on a landing runway), while taking account in particular of information relating to the air brakes of this aircraft, as well as the wind which is predicted on each segment of the flight trajectory.

Figure 3:
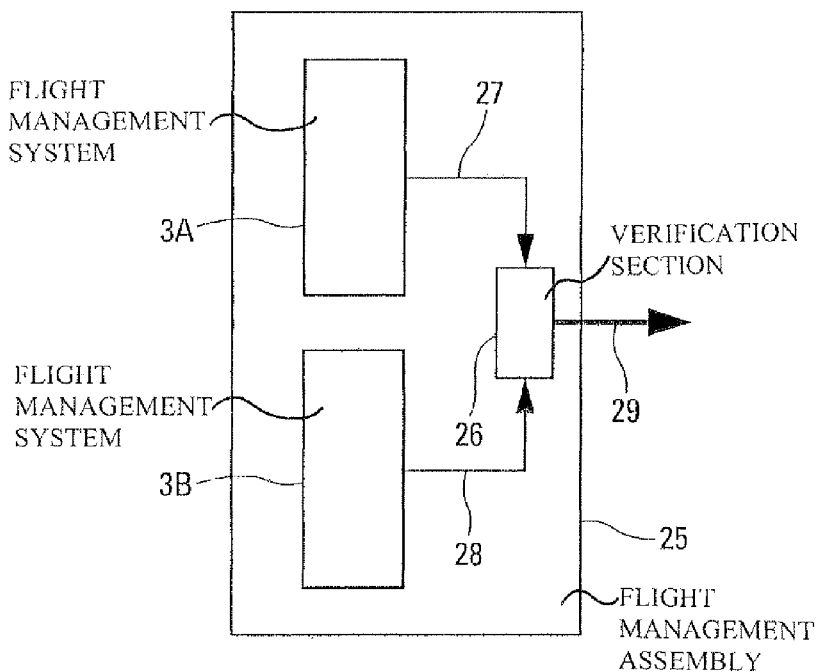
FIG. 3 diagrammatically illustrates a particular embodiment of means forming part of a guidance device in accordance with the invention.

Furthermore, in order to ensure a high level of integrity, said guidance device 1 comprises, instead of a single flight management system 3 such as represented in FIG. 1:

a flight management assembly 25 which comprises at least two flight management systems 3A and 3B which operate independently, as presented in FIG. 3; and means 26 which are connected respectively by way of links 27 and 28 to said flight management systems 3A and 3B, which check the data sent by these two flight management systems 3A and 3B, and which provide information by way of a link 29 (comprising for example the aforesaid links 8, 19 and 22), doing so only when the check carried out by these means 26 detects no irregularity in the data provided by the two flight management systems 3A and 32, and in particular no divergent values (to within an error margin).

Additionally, said guidance device 1 can comprise standard sending means 30 which are connected by way of a link 31 for example to said flight management system 3 and which are able to send out of the aircraft, for example in the form of electromagnetic waves OE, in particular said flight trajectory which has been determined by said flight management system 3. Said means 30 may send the flight trajectory to controllers on the ground and/or to aircraft in the close environment of the aircraft equipped with the guidance device 1 in accordance with the invention. Dual sending such as this relates to a global function dubbed ASAS ("Airborne Separation Assurance System"), the aim of which is to improve air traffic management.

The invention claimed is:

1. A device for guiding an aircraft along a flight trajectory comprising a plurality of successive segments, said device comprising:

at least one navigation database;

at least one flight management system which comprises a flight trajectory segment determining section that determines at least one flight trajectory of the aircraft with the aid of data received from said navigation database;

a flight computer which carries out processing operations intended for guiding the aircraft along said flight trajectory; and actuators of control members of the aircraft, wherein:

said flight computer comprises at least the following integrated components:

a flight trajectory receiving section that receives said flight trajectory from said flight management system;

said flight trajectory segment determining section, which determines the segment of said flight trajectory which is active;

a position error formulating section that formulates errors of position between the actual position of the aircraft and the position that it would have if it were on said active segment; and a guidance law storage that comprises all the guidance laws for the aircraft, corresponding respectively to the various guidance modes capable of being selected and applied to the aircraft, and which are formed in such a way as to formulate all the guidance orders for the aircraft, doing so regardless of the guidance mode which is selected, said guidance orders being transmitted to said actuators.

2. The device as claimed in claim 1, wherein:

said device comprises, moreover, at least one display system capable of displaying said flight trajectory and a monitoring system capable of carrying out processing operations relating to said flight trajectory; and said flight management system communicates the same flight trajectory in one and the same format to said flight computer, to said display system and to said monitoring system.

3. The device as claimed in claim 1, wherein said flight management system communicates to the flight computer all the flight trajectories available to it, and which are of the low-altitude type, and wherein said flight computer comprises a recorder that records these low-altitude flight trajectories.

4. The device as claimed in claim 1, wherein said flight management system determines a four-dimensional flight trajectory comprising a three-dimensional trajectory and indications of corresponding times of passage, and wherein said flight computer comprises a comparator that compares this four-dimensional flight trajectory with the actual position of the aircraft and with the current time, and for deducing therefrom speed directives forming part of said guidance orders.

5. The device as claimed in claim 1, which comprises, moreover, a communication device that sends at least said flight trajectory out of the aircraft.

6. The device as claimed in claim 1, which comprises two flight management systems and a verification section that checks the data sent by theses two flight management systems.

7. The device as claimed in claim 1, which comprises, moreover, a four-dimensional flight trajectory formulating section that formulates a four-dimensional flight trajectory making it possible to comply with a particular spacing with respect to at least one other aircraft.

8. The device as claimed in claim 1, which comprises, moreover, a guidance orders generating section that is integrated into the flight computer and which is formed in such a way as to generate guidance orders making it possible to adapt the energy of the aircraft during a descent, by taking account of information relating to the air brakes of this aircraft.

9. An aircraft, which comprises a device such as that specified under claim 1.

* * * * *